UNITED STATES PATENT OFFICE.

HUGH B. McINTYRE, OF DETROIT, MICHIGAN.

MANUFACTURE OF ARTIFICIAL STONE.

SPECIFICATION forming part of Letters Patent No. 267,239, dated November 7, 1882.

Application filed March 21, 1882. (No specimens.)

*To all whom it may concern:*

Be it known that I, HUGH B. MCINTYRE, of Detroit, in the county of Wayne and State of Michigan, have invented a new and useful Improvement in the Manufacture of Artificial Stone, of which the following is a specification.

My invention consists in an artificial stone manufactured as hereinafter described.

I take equal parts of muriatic, acetic, or sulphuric acid (muriatic acid being preferred) and water, and in this mixture slake hydraulic lime of tiel until effervescence ceases. I then add enough pulverized red iron ore to highly color the mixture. To this mixture I add four parts of pulverized clay and eight parts of sand, emery, or corundum. I then thoroughly mix the whole mass in an ordinary pug-mill, adding thereto one part of silicate of soda or silicate of potash, until a plastic mass is produced which can be tamped in a mold or pressed into shape. When molded or pressed I burn the blocks about two hours at a comparatively low heat.

This composition forms an artificial stone which will resist the action of water, and may be used wet when made into emery-wheels.

I regard acetic and sulphuric acid as known equivalents of muriatic acid in this composition, and do not wish to confine myself absolutely to the proportions herein given, as they may be varied somewhat.

What I claim as my invention, and desire to secure by Letters Patent, is—

An artificial stone composed of hydraulic lime of tiel, slaked in a mixture of equal parts of water and muriatic acid, pulverized red iron ore, pulverized clay, either sand, emery, or corundum, and silicate of soda or silicate of potash, combined substantially as herein set forth.

H. B. McINTYRE.

Witnesses:
ALFRED WOOD,
GEO. H. LOTHROP.